No. 627,541. Patented June 27, 1899.
B. C. SMITH.
CULTIVATOR.
(Application filed Nov. 18, 1897.)
(No Model.)
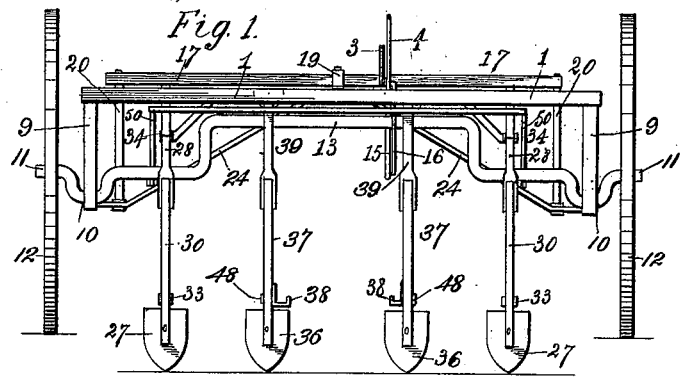
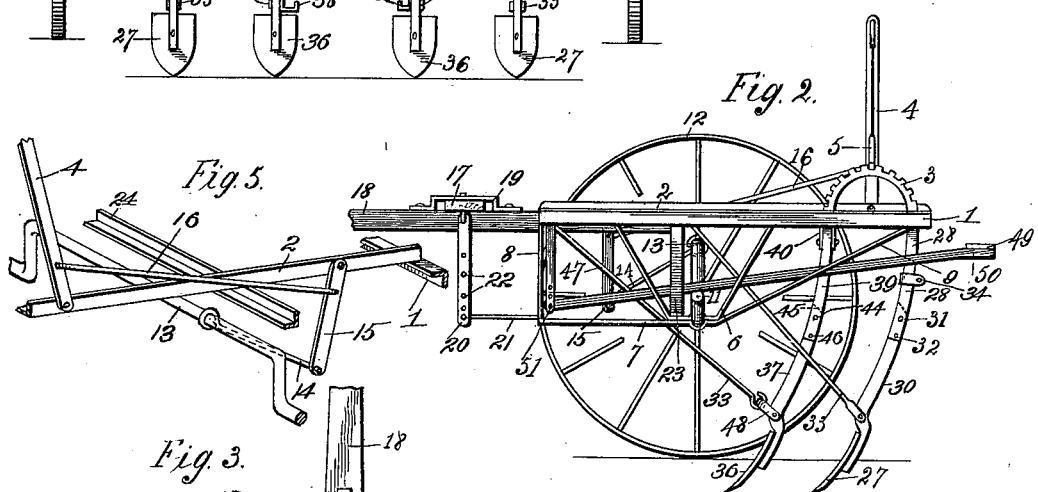
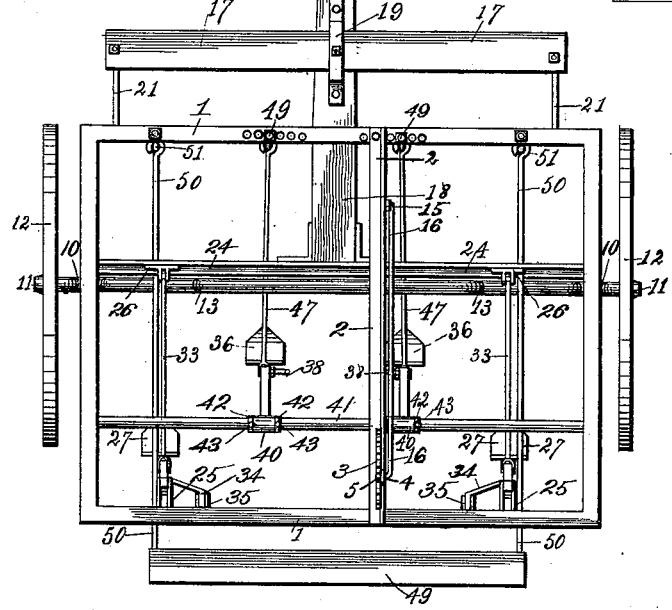
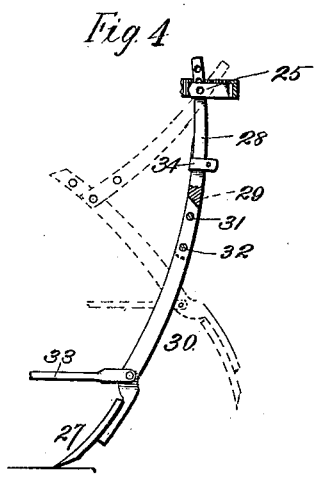
Witnesses:
C. F. Bartholomees
M. R. Remley
B. C. Smith, Inventor
By Higdon Fischer & Thorpe
Att'ys

UNITED STATES PATENT OFFICE.

BENJAMIN C. SMITH, OF KANSAS CITY, KANSAS.

CULTIVATOR.

SPECIFICATION forming part of Letters Patent No. 627,541, dated June 27, 1899.

Application filed November 18, 1897. Serial No. 659,061. (No model.)

*To all whom it may concern:*

Be it known that I, BENJAMIN C. SMITH, a resident of Kansas City, Wyandotte county, Kansas, have invented a new and useful Cultivator for the Purpose of Farming, of which the following is a specification.

My invention relates to cultivators; and my object is to produce a cultivator under perfect control of the driver whereby the crooked plants may be cultivated without injury and without requiring skilful driving to avoid them.

A further object of the invention is to provide cultivating appliances which yield to formidable obstructions to avoid chances of injury to said appliances; and a still further object is to provide a light, strong, and rigid framework.

With these objects in view the invention consists in certain novel and peculiar features of construction and combinations of parts, as will be hereinafter described and claimed; and in order that the invention may be fully understood reference is to be had to the accompanying drawings, in which—

Figure 1 is a rear view of the machine with the cultivating appliances in operative position. Fig. 2 is a side view of the same with the near wheel omitted. Fig. 3 is a top plan view of the machine. Fig. 4 is a detailed side view of one of the inner cultivating appliances. Fig. 5 is a perspective view illustrating the relative position of certain parts more clearly than the other figures.

In said drawings, 1 designates a rectangular frame formed by preference of angle-iron in order to possess the requisite stiffness and strength. 2 is a longitudinal angle-iron connecting the front and back bars of said frame, and 3 is a toothed sector secured to the rear end of bar 2. 4 is a lever pivoted to said bar adjacent to said sector, and 5 are the usual or any preferred locking devices carried by said lever for engagement with said sector. 6 designates a pair of approximately V-shaped brackets depending vertically from the sides of frame 1.

7 designates bars secured to the brackets 6 and provided at their front ends with vertical arms 8, attached to frame 1, and at their rear end with oblique arms 9, secured to the rear part of said frame.

The brackets 6 and bars 7 conjointly form a bearing for the shaft 10, which terminates at its outer ends in the cranks 11, upon which are journaled in the customary or any preferred manner the carrying-wheels 12. Said shaft is provided with a middle crank or arch 13, and said arch is pivotally connected by the link 14 to the pendent swinging arm 15, pivoted to bar 2 and operated by the lever 4 through the medium of the link 16, pivotally connecting said lever and said swinging arm.

When the machine is in practical operation, the lever 4 is manipulated to raise the arch to its vertical position and by so doing depress the frame and the cultivating appliances hereinafter described with relation to the carrying-wheels.

17 is the doubletree pivotally mounted on the tongue 18 in clip 19, carried thereby.

20 designates apertured bars pivotally connected to the doubletree and to the bar 7 at its front end by a link 21. These bars 20 are provided with a vertical series of apertures 22 for engagement with the singletrees. (Not shown.)

The brackets 6 and bars 7 are braced from lateral movement by the oblique braces 23, secured at their lower ends to the brackets and at their upper ends to the cross-bar 24, underlying and forming a support for bar 2 and also supporting the outer cultivating appliances.

25 designates brackets secured to the rear bar of the frame.

26 designates brackets secured to the cross-bar 24 in longitudinal alinement with brackets 25.

The rear cultivating appliances consist of the shovels 27 and the stems carrying the same, said stems consisting of the upper members 28, bifurcated at their lower ends to form shoulders 29, and the lower members 30, the upper ends of which are beveled to fit in said bifurcations and bear squarely against the shoulders 29 to hold the members of the stem in operative relation to each other—that is, to prevent the lower members swinging forward beyond a certain plane on pivots 31, uniting the upper and lower members together. To lock the lower members from swinging back when in practical operation, a breakable pin 32 is fitted in registering holes in said members below the pivots 31. Under a strain which might injure the machine these pins will break and permit the lower members to swing back to the inoperative position, (shown by dotted lines, Fig. 4,) said appliances being guided in such movements by the tie-rods 33, pivotally connecting the lower members with the brackets 26, hereinbefore referred to. The said members are slidably braced from lateral movement by means of the inclined braces 34, which are secured at their lower ends to the upper members of the stems and are pivoted at their upper ends to swing in a vertical plane in brackets 35, secured to the rear bar of frame 1 inward of brackets 25. The inner cultivating appliances, which travel between the appliances already described, consist of the shovels 36, the lower stem members 37, carrying said shovels and provided at their inner sides and near said shovels with foot-rests 38, and the upper members 39, the latter being pivoted at their upper ends to swing laterally in clips 40, flanked at either side by the collars 42, secured at the desired point of adjustment on the rod 41 by set-screws 43 in order that the inner cultivating appliances may be adjusted to accommodate rows of varying widths.

The members 37 and 39, like the members 28 and 30 of the outer cultivating appliances, are pivoted together, as shown at 44, and the lower members have their upper ends beveled to bear against the beveled shoulders 45, formed with the upper members, and said members below the pivots 44 are connected by breakable pins 46, the connection between said upper and lower members being throughout of precisely the same construction as that between the members of the outer cultivating appliances.

47 designates tie-rods pivotally connected at their upper ends to bolts 49, adjustably mounted in the front bar of the frame and pivotally connected at their lower ends by links 48 to the lower members of said inner cultivating appliances. By this arrangement both lateral and vertical movement of the inner members is provided for, the lateral movement being accomplished by the driver, who occupies the seat 49, mounted upon the supporting-bars 50, said bars being adjustably pivoted at their front ends to apertured arms 51, depending from the frame, said bars 50 fulcruming on shaft 10. By adjusting higher or lower said bars 50 the leverage of the seat may be varied to accommodate riders of different weights and the machine be kept on a practically perfect balance.

From the above description it is apparent that I have produced a cultivator which is under perfect control of the driver, who by placing his feet in the foot-rests 38 can swing the inner cultivating appliances to one side or the other, and thereby avoid contact with and consequent injury to the growing plants, the machine passing over said plants easily because of the arch 13 in the shaft.

Having thus described the invention, what I claim as new, and desire to secure by Letters Patent, is—

1. A cultivator, comprising a wheeled frame, cultivating appliances suspended from the frame, and consisting of a pair of outer members which are stationary as regards lateral movement, and a pair of laterally-adjustable inner members; said cultivating appliances consisting of upper members having beveled shoulders, shovel-carrying lower members having their upper ends beveled to engage said shoulders and pivoted to said upper members, and breakable pins connecting said members below said pivotal points, substantially as described.

2. A cultivator, comprising a wheeled frame, cultivating appliances suspended from the frame, and consisting of a pair of outer members which are stationary as regards lateral movement, and a pair of laterally-adjustable inner members; said cultivating appliances consisting of upper members having beveled shoulders, shovel-carrying lower members having their upper ends beveled to engage said shoulders, and pivoted to said upper members, and breakable pins connecting said members below said pivotal points, and pivotal connections between said lower members and the wheeled frame, substantially as described.

3. A cultivator, comprising a wheeled frame, cultivating appliances suspended from the frame, and consisting of a pair of outer members which are stationary as regards lateral movement, and a pair of laterally-adjustable inner members; said cultivating appliances consisting of upper members having beveled shoulders, shovel-carrying lower members having their upper ends beveled to engage said shoulders, and pivoted to said upper members, and breakable pins connecting said members below said pivotal points, links pivoted to the lower members of the inner cultivating appliances to work vertically, tie-rods connected to said links so as to have a lateral and vertical movement, and to the wheeled frame, and tie-rods pivotally connecting the lower members of the outer cultivating appliances with the frame, substantially as described.

4. In a cultivator, a wheeled frame, a transverse rod carried thereby, clips laterally adjustable on said rod, bolts adjustable in said frame, cultivating appliances, consisting of upper members pivoted to work laterally in said clips, and provided with beveled shoulders, and shovel-carrying lower members having their upper ends beveled to engage said shoulders and pivoted to said upper members, and breakable pins connecting said members below their pivotal points, links pivoted to the lower members, tie-rods pivotally connected to said links and to said bolts, and foot-rests secured to said lower members at their inner sides, substantially as described.

BENJAMIN C. SMITH.

Witnesses:
C. A. MOLER,
WARREN B. CHANDLER.